(12) United States Patent
Fan et al.

(10) Patent No.: US 7,784,098 B1
(45) Date of Patent: Aug. 24, 2010

(54) SNAPSHOT AND RESTORE TECHNIQUE FOR COMPUTER SYSTEM RECOVERY

(75) Inventors: Paul Fan, Taipei (TW); Jason Lin, Keelung (TW); Pumbaa Wang, Taipei (TW)

(73) Assignee: Trend Micro, Inc., Tokyo (JP)

( * ) Notice: Subject to any disclaimer, the term of this patent is extended or adjusted under 35 U.S.C. 154(b) by 1403 days.

(21) Appl. No.: 11/181,320

(22) Filed: Jul. 14, 2005

(51) Int. Cl.
G06F 11/00 (2006.01)
G06F 12/14 (2006.01)
G06F 12/16 (2006.01)
G08B 23/00 (2006.01)

(52) U.S. Cl. .......................................... 726/25; 726/24
(58) Field of Classification Search .................. 726/24, 726/25
See application file for complete search history.

(56) References Cited

U.S. PATENT DOCUMENTS

| | | | |
|---|---|---|---|
| 5,381,545 A * | 1/1995 | Baker et al. .................... | 714/19 |
| 6,067,410 A * | 5/2000 | Nachenberg ................. | 703/28 |
| 6,128,630 A * | 10/2000 | Shackelford ....................... | 1/1 |
| 6,161,130 A | 12/2000 | Horvitz et al. | |
| 6,877,109 B2 * | 4/2005 | Delaney et al. ................ | 714/6 |
| 6,973,577 B1 | 12/2005 | Kouznetsov | |
| 6,993,537 B2 * | 1/2006 | Buxton et al. ..................... | 1/1 |
| 7,039,830 B2 * | 5/2006 | Qin ............................. | 714/13 |
| 7,047,303 B2 * | 5/2006 | Lingafelt et al. ............ | 709/229 |
| 7,103,913 B2 | 9/2006 | Arnold et al. | |
| 7,181,583 B2 * | 2/2007 | Saika .......................... | 711/162 |
| 7,188,368 B2 * | 3/2007 | Swimmer et al. ............. | 726/24 |
| 7,188,369 B2 | 3/2007 | Ho et al. | |
| 7,234,076 B2 * | 6/2007 | Daynes et al. ................ | 714/15 |
| 7,376,970 B2 | 5/2008 | Marinescu | |
| 7,409,719 B2 * | 8/2008 | Armstrong et al. ............ | 726/24 |
| 7,409,791 B2 | 8/2008 | Armstrong et al. | |
| 7,565,382 B1 * | 7/2009 | Sobel ............................... | 1/1 |
| 7,581,136 B2 * | 8/2009 | Osaki .......................... | 714/20 |
| 7,587,760 B1 * | 9/2009 | Day ............................. | 726/22 |
| 7,636,946 B2 * | 12/2009 | Verma et al. .................. | 726/24 |
| 7,664,923 B2 * | 2/2010 | Kim et al. .................... | 711/162 |
| 2002/0178374 A1 * | 11/2002 | Swimmer et al. ........... | 713/200 |
| 2003/0023733 A1 * | 1/2003 | Lingafelt et al. ............ | 709/229 |
| 2003/0187853 A1 * | 10/2003 | Hensley et al. ................ | 707/10 |

(Continued)

OTHER PUBLICATIONS

Office Action dated Jan. 16, 2009 in U.S. Appl. No. 11/247,349.

(Continued)

*Primary Examiner*—David García Cervetti
(74) *Attorney, Agent, or Firm*—Beyer Law Group LLP

(57) ABSTRACT

A computer system operation registers as an event when an operation potentially characteristic of malware occurs. Events are scored and when a threshold is reached indicative of a possible malware infection a restore point is created. Many restore points are created. When a user decides to restore the system because of the presence of malware a malware report is retrieved. The malware report describes characteristics of a particular piece of malware. The malware report is compared to the restore point logs that had been created earlier. Any number of malware reports are compared to the restore point logs. A restore point log that shares many of the same system changes or other effects also present in a malware report is likely to be an indication of the beginning of a malware infection. The matched restore point log is recommended to the user as the best restore point.

33 Claims, 16 Drawing Sheets

U.S. PATENT DOCUMENTS

| | | | |
|---|---|---|---|
| 2003/0191782 A1* | 10/2003 | Buxton et al. | 707/202 |
| 2003/0208500 A1* | 11/2003 | Daynes et al. | 707/100 |
| 2004/0034813 A1* | 2/2004 | Chaboud et al. | 714/27 |
| 2004/0111557 A1* | 6/2004 | Nakatani et al. | 711/113 |
| 2004/0199827 A1 | 10/2004 | Muttik et al. | |
| 2005/0060528 A1* | 3/2005 | Kim | 713/1 |
| 2005/0060699 A1* | 3/2005 | Kim et al. | 717/168 |
| 2005/0216759 A1 | 9/2005 | Rothman et al. | |
| 2006/0041942 A1 | 2/2006 | Edwards | |
| 2006/0047931 A1* | 3/2006 | Saika | 711/162 |
| 2006/0136720 A1* | 6/2006 | Armstrong et al. | 713/164 |
| 2006/0136771 A1* | 6/2006 | Watanabe | 714/1 |
| 2006/0137010 A1* | 6/2006 | Kramer et al. | 726/22 |
| 2006/0173935 A1* | 8/2006 | Merchant et al. | 707/204 |
| 2006/0236049 A1* | 10/2006 | Iwamura | 711/162 |
| 2007/0006304 A1* | 1/2007 | Kramer et al. | 726/22 |
| 2007/0088970 A1* | 4/2007 | Buxton et al. | 714/2 |

OTHER PUBLICATIONS

Office Action dated Apr. 2, 2009 in U.S. Appl. No. 11/204,567.
Office Action dated Jun. 3, 2009 in U.S. Appl. No. 11/356,600.
Office Action dated Jun. 15, 2009 in U.S. Appl. No. 11/247,349.

* cited by examiner

Snapshot/Restore System

| Event Type | Score |
|---|---|
| New File Added | 6 |
| Adding Registry Key | 3 |
| New Process Added | 3 |
| New Registry Added | 4 |
| Modified System Service Table | 4 |
| . . . | . . . |

454 456

450

Scoring Table

*FIG. 7*

Log Details

| Restore Point Name: | Test |
|---|---|
| Log Time: | 2005/5/18 05:12 |
| Score: | 13 |
| Snapshot Point: | MS-10001 |

— 504

New File

Path = c:\windows\run.exe
Path = c:\windows\system32\mssvc.dll

— 508

Modified File

Path = c:\windows\win.ini

— 512

New Registry

Key = HKLM\Software\Microsoft\Windows\CurrentVersion
Value = AutoStart
Data = c:\windows\run.exe

— 516

Modified Registry

— 520

Process Creation

Name = run.exe

— 524

Process Termination

Name = run.exe

— 528

500

Restore Point Log

*FIG. 8*

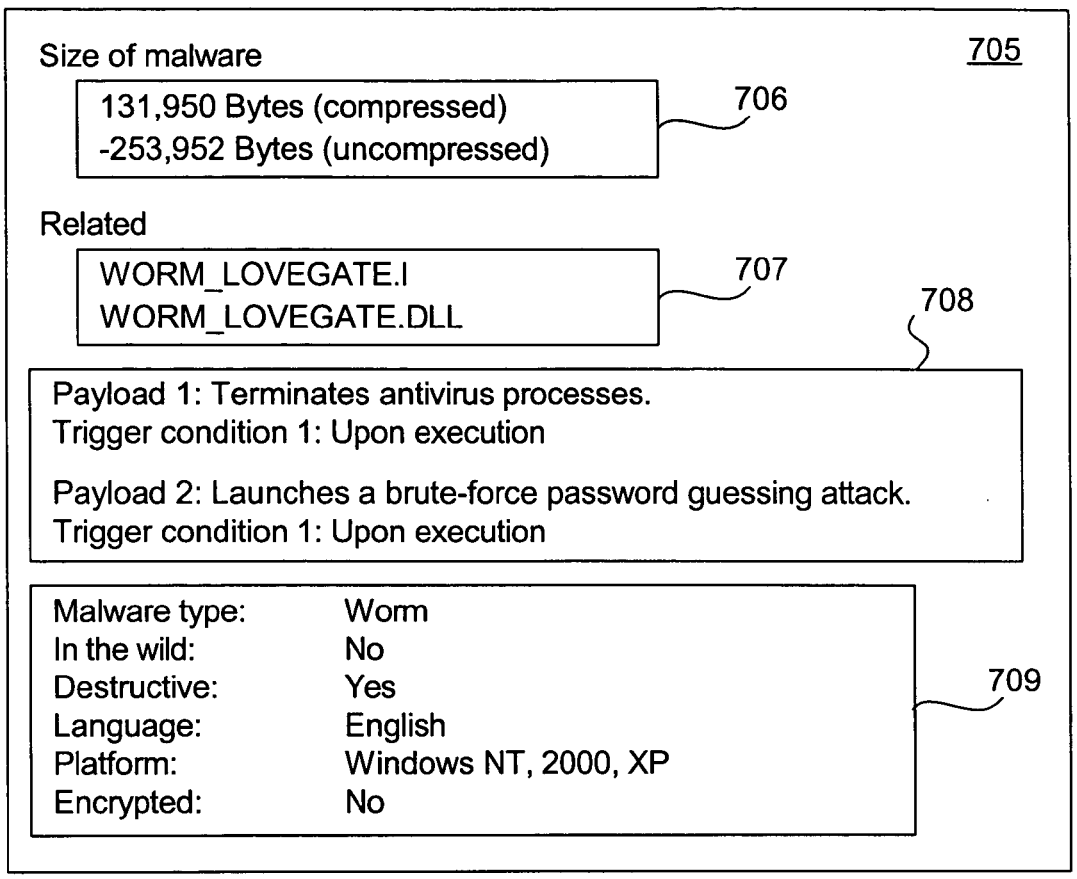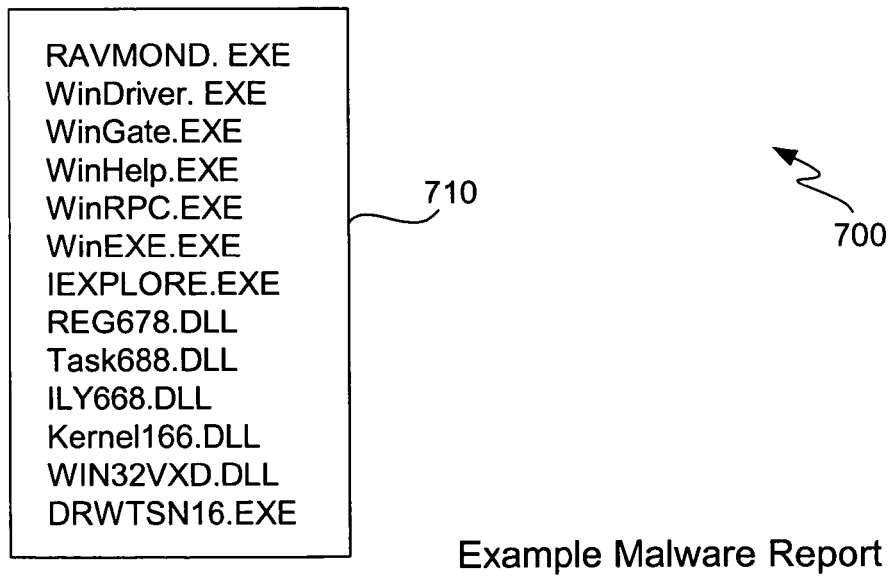
Example Malware Report
FIG. 10A

Registry Entries Added

HKEY_LOCAL_MACHINE\SOFTWARE\Microsoft\Windows\
CurrentVersion\Run
WinGate initialize =
"C:\WINNT\System32\WinGate.exe - remoteshell"

HKEY_LOCAL_MACHINE\SOFTWARE\Microsoft\Windows\
CurrentVersion\Run
Remote Procedure Call Location =
"RUNDLL32.EXE reg678.dll ondll_reg"

HKEY_LOCAL_MACHINE\SOFTWARE\Microsoft\Windows\
CurrentVersion\Run
Program In Windows = "C:\WINNT\System32\IEXPLORE.EXE"

HKEY_CURRENT_USER\Software\Microsoft\Windows NT\
CurrentVersion\Windows
"Run = RAVMOND.exe"

HKEY_LOCAL_MACHINE\CurrentControlSet\Services\Windows\
Management Instrumentation Driver Extension
DisplayName = "Windows Management Instrumentation Driver
Extension"
ObjectName = "LocalSystem"

HKEY_LOCAL_MACHINE\SYSTEM\CurrentControlSet\Services\
NetMeeting\Remote Desktop (RPC) Sharing
DisplayName = "NetMeeting Remote Desktop (RPC) Sharing"
ObjectName = "LocalSystem"

— 715

Modified registry

HKEY_CLASSES_ROOT\exefile\shell\open\command
Default = "winexe.exe %1"

— 720

Entries Added to WIN.INI

Run=%System%\RAVMOND.EXE

Network Propagation-Files Dropped

Are you looking for Love.doc.exe
autoexec.bat
The world of lovers.txt.exe
How To Hack Websites.exe
Panda Titanium Crack.zip.exe
Mafia Trainer ! ! ! .exe
100 free essays school.pif
AN-YOU-DUCK-IT.txt.pif
Sex_For_You_Life.JPG.pif
CloneCD + crack.exe
Age of empires 2 crack.exe
MoviezChannelsInstaler.exe
Star Wars II Movie Full Downloader.exe
Winrar + crack.exe
SIMS FullDownloader.zip.exe
MSN Password Hacker and Stealer.exe

⎯730

Network Propagation-Files Dropped with Extensions

.dat.exe
.gif.exe
.doc.exe
.avi.exe
.rm.exe
.htm.exe
.mp3.exe
.jpg.exe
.txt.exe

Mailing Routine-Reply to all New Messages

From: <Infected User's Name>

To: <Original Sender>

Subject: RE: <Original Sender>

Message Body:
    '<Infected User's Name>' wrote:

>< Original Sender's SMTP account> account auto reply:

If you can keep your head when all about you
Are losing theirs and blaming it on you
If you can trust yourself when all men doubt you
But make allowance for their doubting too;
If you can wait and not be tired by waiting
Or, being lied about don't deal in lies
Or, being hated don't give way to hating
And yet don't look too good, nor talk too wise
...... more look to the attachment.

>Get your FREE <Original Sender's SMTP account> account now!<

Attachment:
I am for it.doc.exe
Britney spears nude.exe.text.exe
joke.pif
DSL Modem Uncapper.rar.exe
Industry Giant II.exe
StarWars2 - CloneAttack.rm.scr
dreamweaver.MX (crack).exe
Shakira.zip.exe
SETUP.EXE
Macromedia flash.scr
How to Crack all gamez.exe
Me_nude.AVI.pif
s3msong.MP3.pif
Deutsch BloodRatch!.exe
Sex in Office.rm.scr
the hardcore game.pif

Mailing Routine-Target Addresses

To: [Addresses from .ht* files]  — 745

Subject:
Reply to this
Let's Laugh
Last Update
for you
Great
Help
Attached one Gift for u.
Hi
Hi Dear
See the attachment

— 750

Message Body:

For further assistance, please contact.

Copy of your message, including all the header's is attached.

This is the last cumulative update.

Tiger Woods had two eagles Friday during his victory over Steven Leaney. , (AP Photo/ Denis Poroy)

Send reply if you want to be official beta tester. This message was created automatically by mail delivery software. (Exim)

It's the long awaited film version of the Broadway hit. Set in the roaring 20's, this is the story of Chicago chorus girl Roxy Hart (Zellweger), who shoots her unfaithful lover (West).

Adult content: Use with parental advisory)
Patrick Ewing will give Knicks fans something to cheer about Friday night.

Send me your comments.

— 755

Attachment:

About_me.txt.pif driver.exe

Doom3 Preview!!!.exe enjoy.exe

YOU_are_FAT.TXT.exe source.exe

Interesting.exe

README.TXT.pif images.pif

Pics.ZIP.scr

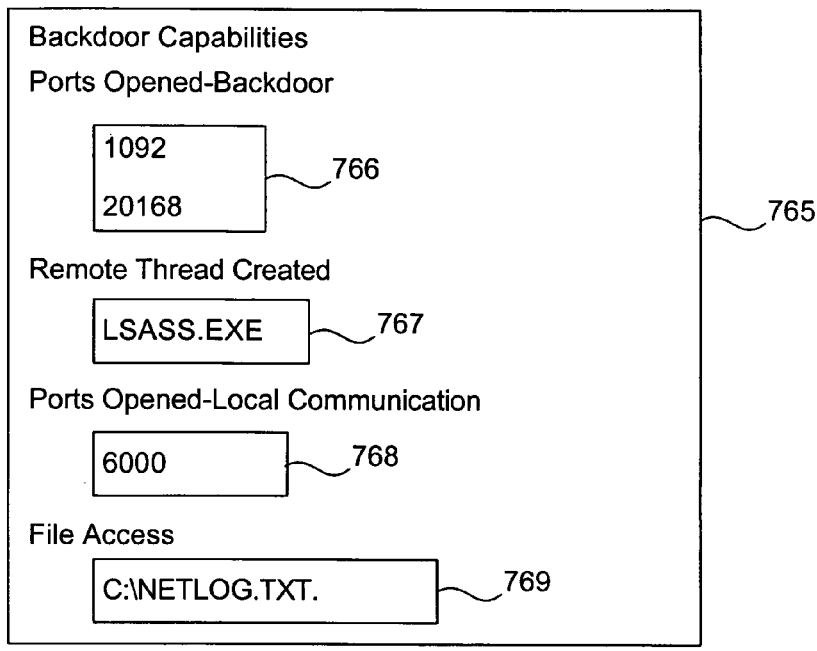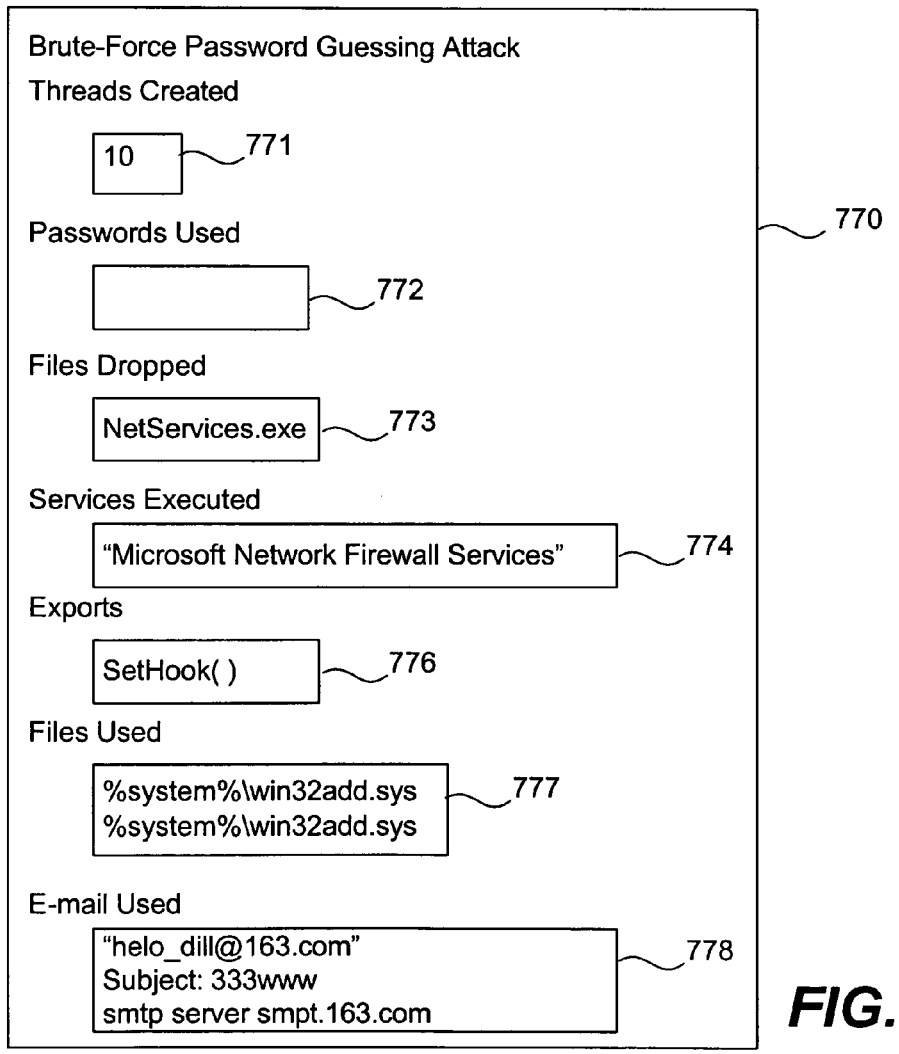
FIG. 10F

Antivirus Retaliation Techniques

Processes Terminated-Strings Present in Name
  KV
  KAV
  Duba
  NAV
  kill
  Gate
  McAfee
  Symantic
  SkyNet
  rising
  RavMon.exe
  Rfw.exe

— 780

File Infection Routine-fixed Drives

EXE files
Sleep Time: 1 hour 30 seconds

— 785

Events Registered

I--- WORM---IPC--- 20168
I-WORM-Local-Remote-20168 Running!

— 790

APIs Required

NTDLL.DLL

SNAPSHOT AND RESTORE TECHNIQUE FOR COMPUTER SYSTEM RECOVERY

FIELD OF THE INVENTION

The present invention relates generally to addressing malicious software in computer systems. More specifically, the present invention relates to computer system recovery after malicious software is found in a computer system.

BACKGROUND OF THE INVENTION

Currently, it is common for malicious software such as computer viruses, worms, spyware, etc., to affect a computer such that it will not behave as expected. Malicious software can delete files, slow computer performance, clog e-mail accounts, steal confidential information, cause computer crashes, allow unauthorized access and generally perform other actions that are undesirable or not expected by the user of the computer.

Current technology allows computer users to create backups of their computer systems and of their files and to restore their computer systems and files in the event of a catastrophic failure such as a loss of power, a hard drive crash or a system operation failure. But, in these situations the computer user generally knows when the failure has occurred. Assuming that the user had performed a backup prior to the failure, it can be straightforward to restore their computer system and files to a state prior to the computer failure. Of course, those users who perform a backup more frequently will generally be able to restore their computer system to a point closer to the time of the failure. Unfortunately, these prior art techniques are not effective when dealing with infection of a computer by malicious software.

FIG. 1 illustrates a prior art technique for taking scheduled "snapshots" and manual "snapshots" of a computer system. Traditional backup/restore software applications allow an operating system or a user to take a snapshot of the state of a computer and its files at a particular point in time. A snapshot typically records changes to the computer system and its files from a previous point in time and allows a user to restore their computer system to a time when the snapshot was taken. Timeline 10 shows a series of hourly scheduled snapshots taken automatically by the computer system and timeline 20 shows a number of manual snapshots initiated by the user. Scheduled snapshots are only taken when scheduled (e.g., hourly, daily or weekly) and are not triggered by a particular event. Manual snapshots are typically initiated by a computer user at important milestones such as at an important software installation, a project completion, a server upgrade or a system integration. These snapshot methods might be suitable for a hardware crash or a system error, but if the computer has been infected by malicious software the backup/restore application has no idea when the infection occurred and thus does not know from which point to restore the computer.

For example, in timeline 10 if the computer user does not become aware of the infection until after 1800 then the user might waste a lot of time trying to restore the computer at points 1800, 1700 and 1600, only to find that the computer is still infected. It is only when the user uses the snapshot taken at time 1400 to restore the computer is the computer finally restored to a malicious software-free state. Even if the user has taken manual snapshots as in timeline 20, the user still is unaware of when the computer was first infected and does not know from which snapshot point to restore the computer. If the malicious software is detected days or weeks after the initial infection it can be nearly impossible to determine when the infection first occurred. A user might err on the side of caution and decide to restore the computer from a point days or weeks before the infection occurred, but then valuable system and user data might be lost.

Another problem arises because the computer user is unaware of when the malicious software first infected the computer system. Certain backup/restore applications store restore points and their data in protected system files. Because these system files might not be scanned by virus scanning software, it is possible that a given snapshot and its associated restore point contains malicious software. Because the user does not know at which point in time the computer became infected, he or she may inadvertently restore the computer using a snapshot that contains malicious software. Further, certain malicious software uses protected kernel mode drivers that cannot be scanned by many types of virus scanning software. In both of these situations, running virus scanning software might be ineffective and provide a false sense of security because the scanning software would be ineffective in removing the malicious software.

For the above reasons, it is desirable to have a system and technique that would address the above deficiencies in the prior art and would allow a computer system to recover properly and with minimal effort after being infected by malicious software.

SUMMARY OF THE INVENTION

To achieve the foregoing, and in accordance with the purpose of the present invention, a technique is disclosed that provides a prediction of the point in time when malicious software begins to infect a computer system and recommends the best point from which to restore the computer system.

In one embodiment the present invention monitors system operations and registers an event when an operation potentially characteristic of a malware infection occurs. Events are scored and when the number and type of events reach a certain level indicative of a possible malware infection a restore point is created. Any number of restore points may be created during the course of computer system operation. Thus, restore points are created that reflect points in time when it is probable that malware has infected a computer system, rather than restore points that are created at scheduled times or manually by the user.

In a second embodiment the present invention provides a restore point suggestion to the user when the user decides it is necessary to restore the computer system to an earlier state. The decision on which point is the best restore point is achieved by comparing a malware report with the restore point logs that have been created earlier. A restore point log that shares many of the same system changes or other effects also present in the malware report is likely to be an indication of the beginning of a malware infection. Because there might be many restore points which appear to have the potential of being the beginning of the malware infection, it is beneficial to compare these restore points with a malware report to determine which restore point is the beginning of the malware infection. Any number of malware reports may also be compared to the restore points in question to help determine which restore point might be the beginning of a malware infection.

A third embodiment of the invention combines the first to embodiments. Thus, the third embodiment contemplates not only scoring system events and creating likely restore points, but also comparing a malware report (or reports) to the previously stored restore points in order to provide an intelligent recommendation to the user.

The present invention has many advantages. It is suitable for malware infection recovery by providing a point in time for the beginning of a possible malware infection. Traditional backup/restore software applications cannot decide which of many potential restore points is malware free; such applications work best for system error or hardware crash types of recovery because the user and application are generally aware of when the system error or hardware crash occurred. Such traditional applications have no knowledge of when malware might first have been present on a computer system. The invention is also suitable for use when malware has infected a kernel mode driver. Traditional cleanup software is unable to remove malware from such drivers.

BRIEF DESCRIPTION OF THE DRAWINGS

The invention, together with further advantages thereof, may best be understood by reference to the following description taken in conjunction with the accompanying drawings in which:

FIG. 7 illustrates a scoring table that associates a score with an event type.

FIG. 8 illustrates an example of a restore point log.

FIGS. 10A-10G illustrate an example malware report.

DETAILED DESCRIPTION OF THE INVENTION

Figure 1:
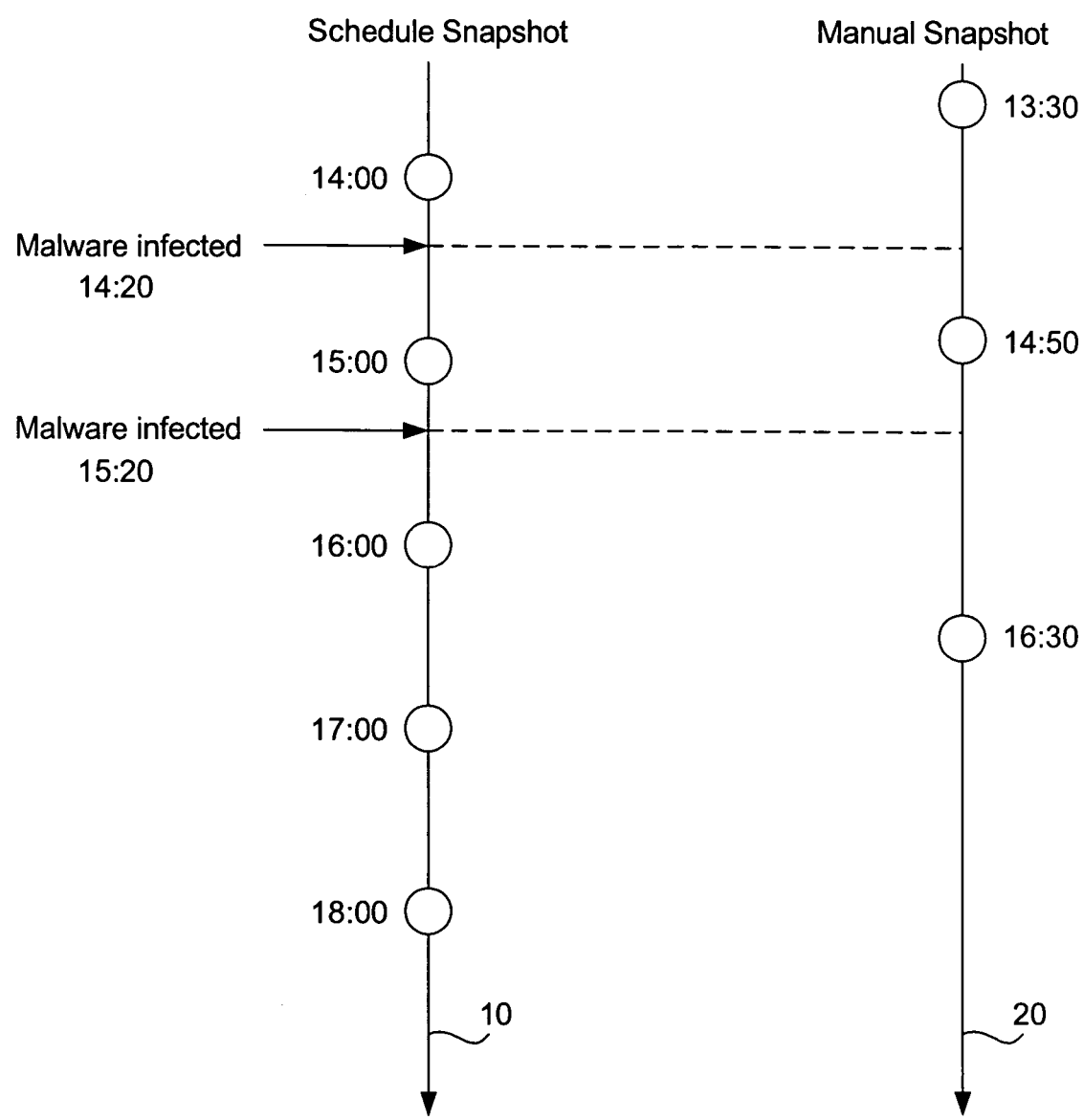
FIG. 1 illustrates a prior art technique for taking scheduled snapshots and manual snapshots of a computer system.

The present invention is applicable to all malicious software, or malware, that generally causes harm to a computer system, provides an effect that is not expected by the user, is undesirable, illegal, or otherwise causes the user to want to restore their computer system from a time prior to when it was infected by the malware. Malware can be classified based upon how is executed, how it spreads or what it does. The below descriptions are provided as guidelines for the types of malware currently existing; these classifications are not perfect in that many groups overlap. Of course, later developed software not currently known may also fall within the definition of malware.

When computer viruses first originated common targets were executable files and the boot sectors of floppy disks, later targets were documents that contain macro scripts, and more recently, many computer viruses have embedded themselves in e-mail as attachments. With executable files the virus arranges that when the host code is executed the virus code is executed as well. Normally, the host program continues to function after it is infected by the virus. Some viruses overwrite other programs with copies of themselves, thus destroying the program. Viruses often spread across computers when the software or document to which they are attached is transferred from one computer to another. Computer worms are similar to viruses but are stand-alone software and thus do not require host files or other types of host code to spread themselves. They do modify the host operating system, however, at least to the extent that they are started as part of the boot process. In order to spread, worms either exploit some vulnerability of the target host or some kind of social engineering to trick users into executing them.

A Trojan horse program is a harmful piece of software that is often disguised as legitimate software. Trojan horses cannot replicate themselves, unlike viruses or worms. A Trojan horse can be deliberately attached to otherwise useful software by a programmer, or can be spread by tricking users into believing that it is useful. Some Trojan horses can spread or activate other malware, such as viruses (a dropper). A wabbit is a third, uncommon type of self-replicating malware. Unlike viruses, wabbits do not infect host programs or documents. And unlike worms, rabbits do not use network functionality to spread to other computers. A simple example of a wabbit is a fork bomb.

Spyware is a piece of software that collects and sends information (such as browsing patterns or credit card numbers) about users and the results of their computer activity without explicit notification. Spyware usually works and spreads like Trojan horses. The category of spyware may also include adware that a user deems undesirable. A backdoor is a piece of software that allows access to the computer system by bypassing the normal authentication procedures. There are two groups of backdoors depending upon how they work and spread. The first group work much like a Trojan horse, i.e., they are manually inserted into another piece of software, executed via their host software and spread by the host software being installed. The second group work more like a worm in that they get executed as part of the boot process and are usually spread by worms carrying them as their payload. The term ratware has arisen to describe backdoor malware that turns computers into zombies for sending spam.

An exploit is a piece of software that attacks a particular security vulnerability. Exploits are not necessarily malicious in intent—they are often devised by security researchers as a way of demonstrating that a vulnerability exists. They are, however, a common component of malicious programs such as network worms. A root kit is software inserted onto a computer system after an attacker has gained control of the system. Rootkits often include functions to hide the traces of the attack, as by deleting logged entries or by cloaking the attacker's processes. Rootkits might include backdoors, allowing the attacker to easily regain access later or to exploit software to attack other systems. Because they often hook into the operating system at the kernel level to hide their presence, rootkits can be very hard to detect.

Key logger software is software that copies a computer user's keystrokes to a file which it may send to a hacker at a later time. Often the key logger software will only awaken when a computer user connects to a secure web site such as a bank. It then logs the keystrokes, which may include account numbers, PINs and passwords, before they are encrypted by the secure web site. A dialer is a program that replaces the telephone number in a modem's dial-up connection with a long-distance number (often out of the country) in order to run up telephone charges on pay-per-dial numbers, or dials out at night to send key logger or other information to a hacker. Software known as URL injection software modifies a browser's behavior with respect to some or all domains. It modifies the URL submitted to the server to profit from a given scheme by the content provider of the given domain. This activity is often transparent to the user.

System Overview

Figure 2:
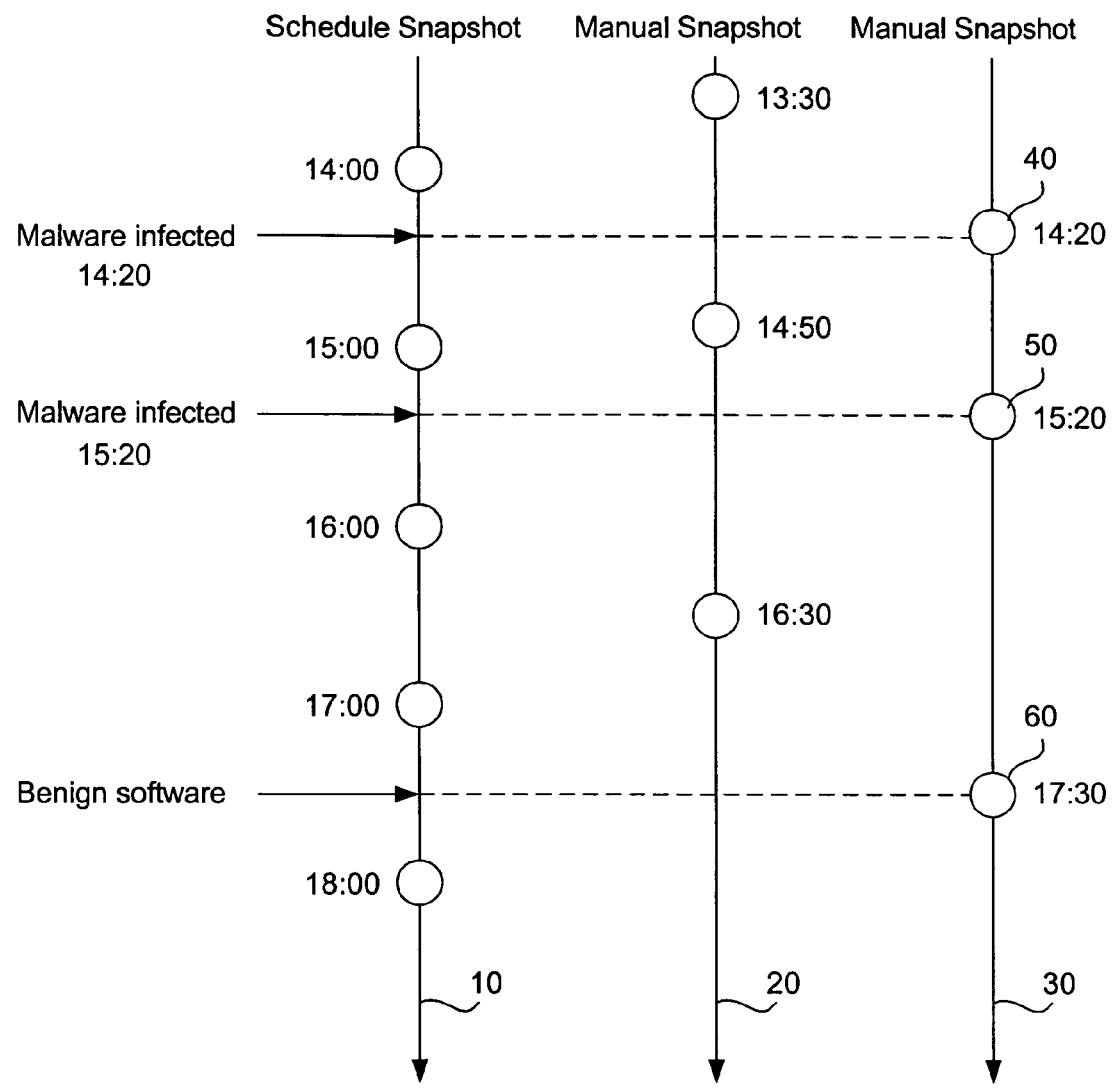
FIG. 2 illustrates a technique for taking a snapshot according to one embodiment of the invention.

FIG. 2 illustrates a technique for taking an intelligent snapshot according to one embodiment of the invention. Timelines 10 and 20 are present as in FIG. 1 and an additional timeline 30 illustrates snapshots being taken at points 40 and 50. As shown, malware has infected the computer system at times 1420 and 1520 and the present invention operates to take a snapshot of the system at that point in time when the malware starts to infect the system. Additionally, a snapshot is taken at point 60 when benign software within the computer system takes actions that might be interpreted as the beginning of a malware infection. As will be discussed in greater detail below, a threshold may be adjusted such that snapshots are taken when malware begins to infect the computer and also when benign software takes actions that appear to be malware. Such a threshold would err on the side of caution. Or, the threshold may be adjusted such that snapshots are only taken when it is a near certainty that malware has begun to infect the system; of course, such a threshold may miss certain types of malware. In one embodiment of the invention, the threshold is adjusted based on experience and is designed to capture all malware infections and to a lesser extent actions taken by benign software.

Even though the present invention might initiate a snapshot based upon the actions of benign software, it still initiates snapshots and creates restore points at points in time that include the beginnings of a malware infection. In other words, even though the present invention might initiate snapshots and create restore points that do not reflect a malware infection, it will also create restore points that do reflect that particular point in time when a malware infection has begun. As will be described in greater detail below, the restore adviser module of the present invention then operates to recommend a restore point from which to restore the computer system. Advantageously, the present invention can then recommend performing a restore from the point in time when the malware first began to infect the computer system, unlike the prior art techniques shown in timelines 10 and 20 which cannot inform the user of when a malware infection began.

Figure 3:
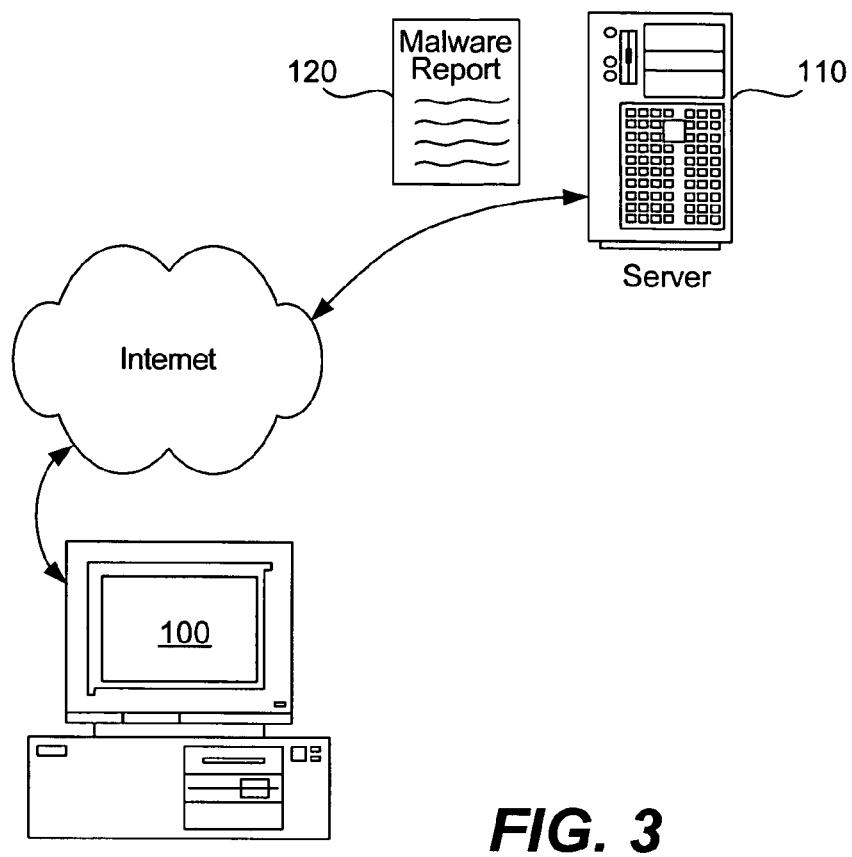
FIG. 3 is a block diagram showing one environment for operation of the present invention.

FIG. 3 is a block diagram showing one environment for operation of the present invention. Shown is a user computer 100 connected to the Internet to which is also connected a server computer 110. Computer 100 has the potential to be infected by malware and also includes software modules embodying the present invention. Computer 100 is any suitable computing platform such as a handheld computing device, a laptop computer, a desktop computer, a server computer, etc. In one embodiment of the invention, computer 100 is an IBM-compatible desktop computer running the Microsoft operating system version XP Professional.

Server computer 110 is any suitable computer within an organization that has the capability to analyze various types of malware and to compile reports on the malware that describe its characteristics. Analysis of malware such as viruses and description of malware characteristics is known in the art; by way of example, the organization Trend Micro, Inc. has the capability to prepare such malware reports. The web site for this organization currently lists malware reports available for public inspection that describe computer viruses and other types of malware. Malware report 120 may be delivered to computer 100 via the Internet, via electronic mail, via facsimile, or via any other suitable communication means. Malware report 120 is described in greater detail below with reference to FIGS. 10A-10G.

Snapshot/Restore System

Figure 4:
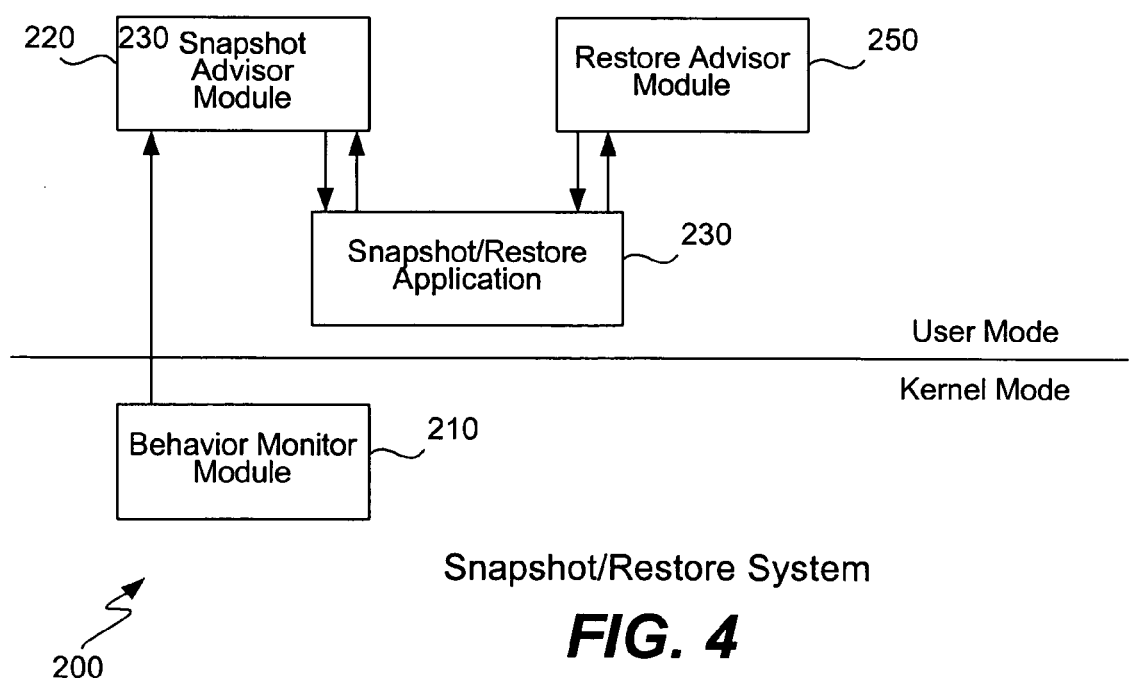
FIG. 4 is a block diagram of the snapshot/restore system according to one embodiment of the invention.

FIG. 4 is a block diagram of the snapshot/restore system 200 according to one embodiment of the invention. In order to record a snapshot at the point in time when malware begins to infect a computer system and to later recommend a restore point the system includes the following software components. Behavior monitor module 210 and snapshot adviser module 220 work together using operating system events and a scoring system to make a decision on when to take a system snapshot. Snapshot/restore application 230 is any software application that can take a system snapshot and create a restore point. Restore adviser module 250 makes an informed decision regarding which restore point is the best point from which to restore the computer system.

Behavior monitor module 210 is real-time software including two functional kernel mode drivers that monitors operating system operations. Preferably, this module operates in kernel mode (also referred to as system mode) which is one of two modes of operation of the CPU, the other being user mode. Operating systems such as Linux, those available from Microsoft Corporation, the FreeBSD and Sun Solaris operating systems also make use of these two modes of operation. Kernel mode is a privileged mode of operation in which the CPU is assumed to be executing trusted software and thus can execute any instruction and reference any memory address. The kernel (the core of the operating system) and any applications executing in kernel mode are considered trusted software.

Module 210 monitors and intercepts operating system operations such as file and registry access, process creation and process termination, and certain system APIs such as CreateProcess( ) CreateRemoteThread( ) and VitualAlloc( ). Other operations that may be intercepted relate to network packet traffic, the kernel module list, Winsock LSP (Layer Service Provider) and COM Objects. Even e-mail events can also be intercepted in order to detect malware; such interception can be implemented by a network packet monitor.

Other system operations that might be indicative of execution of malware may also be monitored and intercepted. These system operations are reported as an event to a user mode component (snapshot adviser module 220) when the monitored system operation occurs. Module 210 is implemented as two functional drivers but may also be implemented as a single driver. In one specific embodiment, module 210 includes a TMCommon module that provides the common functions for all the other kernel modules, a TMEvent management module that manages all of the hook implementation, and an activity monitor module that monitors the file, registry and process activities and reports them to user mode component.

Figure 5:
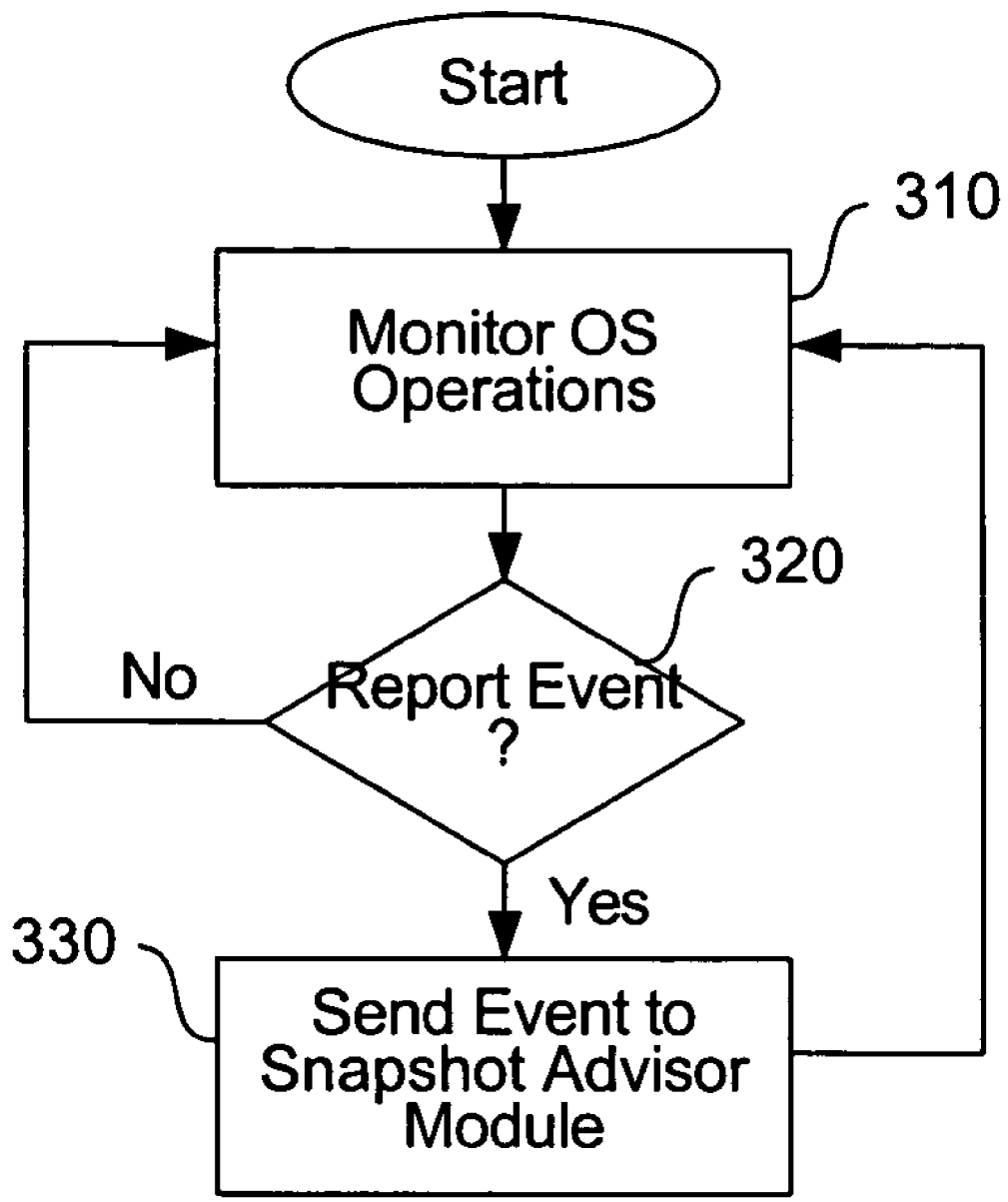
FIG. 5 is a flow diagram describing operation of the behavior monitor module.

FIG. 5 is a flow diagram describing operation of the behavior monitor module. Step 310 is a looping construct in which the module monitors all operating system operations. In particular, operations including file access, registry access, process creation and process termination are monitored and intercepted. Step 320 decides which of these events to report to the snapshot adviser module 220. In one embodiment of the invention, all of the above operations are reported to module 220 as they generally might be indicative of malware beginning to infect the computer system. In other embodiments certain criteria may be used to decide which events to report and which events not to report. For example, certain registry activities are not reported; if the activities are generated by a trusted process (an operating system component, processes from a known software product) these kinds of events are not reported.

If the operation is not to be reported then control returns to step 310 were monitoring continues. Otherwise, in step 330 the intercepted operation is sent as an event to snapshot adviser module 220 along with any relevant data. For example, for any file event the following information is included: process identifier; file name; and the file creation flag. For any registry events the following information is included: process identifier; process name; and registry data. For any process event the following information is included: process identifier, process name, process's image path, and the process creation flag. If it exists, the parent process identifier is also included. Once the event and its associated data has been sent to snapshot adviser module 220 control returns to step 310.

The snapshot adviser module 220, the snapshot/restore application 230 and the restore adviser module 250 all preferably operate in user mode. As mentioned above, user mode (as opposed to kernel mode) is one of two operating modes for a CPU. As is known in the art, user mode is a non-privileged mode in that a process in user mode cannot access those portions of memory that have been allocated to the kernel or to other programs. In some situations, a user mode process that wants to use a service provided by the kernel can switch temporarily into kernel mode. Snapshot/restore application 230 is any suitable custom or off-the-shelf software application that provides the ability to take a snapshot of the state of the computer system, to create restore points from which the system may be restored, and to restore the computer system from a particular restore point. In some situations, application 230 may also include the capability to back up user and system files. A suitable application 230 enables a user, system administrator or other to restore a computer to a previous state in the event of a problem without losing data files. Application 230 can create restore points at a scheduled time or times each day, can automatically create restore points at the time of significant system events such as application or driver installation, or can create restore points manually at the direction of a user.

Suitable snapshot/restore applications are known in the art and will typically restore such information as the registry, profiles, caches, files with certain extensions, etc. Typically, user created data is not restored (to avoid deleting user created files). The snapshot/restore system 200 contemplates application 230 as being a separate component, thus providing the flexibility to integrate any snapshot/restore application from another party into the system. Such a separate application may be implemented as plug-in software or in other manners known in the art. Alternatively, application 230 may be a custom software application that is a separate component, or it may be integrated with other components of the system. In one embodiment of the invention, the software application known as XP System Restore from Microsoft Corporation is used. XP System Restore is a feature of the Microsoft XP operating system. When XP System Restore is used the present invention uses the APIs that Microsoft provides. Information on how the Microsoft API may be used is available from Microsoft Corporation and is known to those of skill in the art. Other software applications (such as snapshot adviser module 220 and restore adviser module 250) can provide commands to, and can receive data from, the XP System and Restore application by utilizing the Microsoft API. Of course, other snapshot/restore applications 230 may also be suitable for use with the present invention and these include backup/restore software from FalconStor Software and from Phoenix Software.

Returning now to a discussion of the components of system 200, consider snapshot adviser module 220. Module 220 uses a scoring system that can identify possible malware behavior and begin recording system changes at that time. For example, a score is given to each monitored system event received from the behavior monitor module and the scores are totaled while changes are being monitored. Once the total score of all monitored system events exceeds a certain threshold then this series of monitored system events will be identified as possible malware behavior and a restore point will be created.

Figure 6:
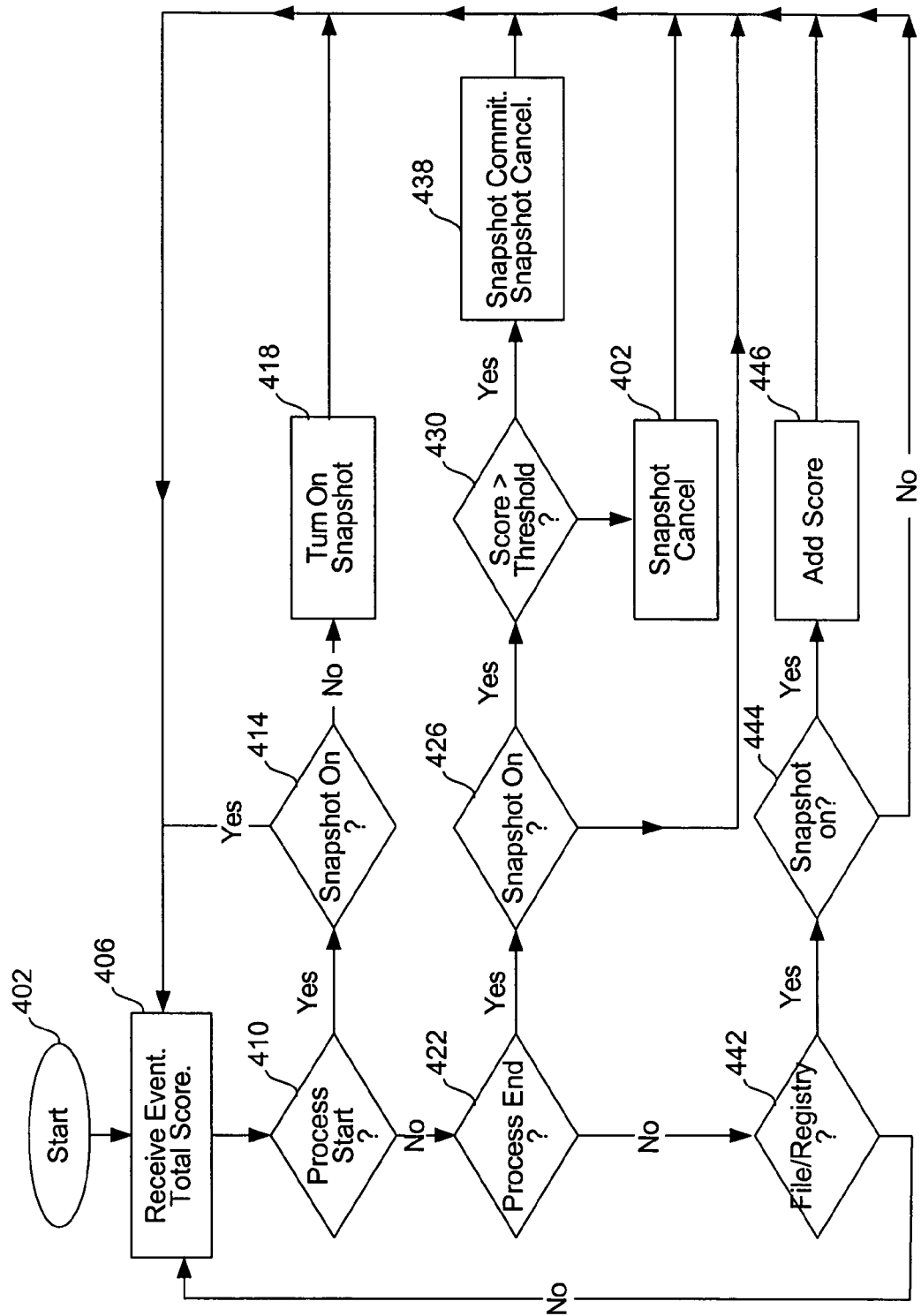
FIG. 6 is a flow diagram illustrating operation of the snapshot adviser module.

FIG. 6 is a flow diagram illustrating operation of snapshot adviser module 220. Before operation of system 200 a score threshold is set that helps in determining whether a monitored set of system events might be the beginning of a malware infection. A score threshold may also be set during operation if a user so desires. For example, a threshold may be set at a total score of 10 indicating that if a total score of system events exceeds 10 then it is a suspected that the monitored system events are the beginning of a malware infection. Of course, the threshold may be set at any suitable number. A higher threshold would generate fewer suspected cases of malware, while a lower threshold would generate more suspected cases but might also include instances of benign software that merely appear to be malware. In addition, it is possible for the threshold to be adjusted during operation of the system or that the threshold be adjusted depending upon certain criteria. For example, the threshold setting may be part of product configuration, the user can determine the threshold setting, or in the event of a malware outbreak the threshold setting can be adjusted.

In step 406 the event along with its associated relevant data is received from the behavior monitor module and a log is kept of all events received. Also in this step a running score is kept to determine the current total score. FIG. 7 illustrates a scoring table 450 that associates a score 456 with an event type 454. For example, should the event indicate that a new file has been added, the running score is incremented by a value of six; a new process being added would increment the score by value of three. Of course, the score for a particular event may vary and the importance of a particular event type may be monitored or indicated by using techniques other than by keeping score. Other techniques may be used for determining if malware is present such as using CreateRemoteThread to other processes and using the SetWindowHookEx application programming interface (API).

In one embodiment of the present invention, a running score is kept only when a snapshot is turned on. For example, if a snapshot has been turned on then the total score will be incremented as events are received in step 406. Keeping a running score while a snapshot is turned on is performed because it is during that period of time during which it is suspected that malware might be infecting the computer.

Next, steps 410, 422 and 442 check the type of event that has occurred and will turn a snapshot on, turn a snapshot off or commit a snapshot depending upon the circumstances. If the event is a process start (step 410) and a snapshot has already been turned on (414) then control returns to step 406. On the other hand, if a snapshot is not already on, then in step 418 a snapshot is turned on by sending an appropriate command via an API to the snapshot/restore application 230. In the embodiment where application 230 is XP System Restore specific commands are given as shown below:

Set pRestorePtSpec.dwEventType=BEGIN_SYSTEM_CHANGE

SRSetRestorePoint(PRESTOREPOINTINFO, pRestorePtSpec, PSTATEMGRSTATUS pSmgrStatus)

A snapshot is turned on at this point in time because since a new process has started it is apparent that there is activity and the computer system might begin to change. Thus, a command is given to application 230 to begin monitoring system activity and recording changes as they occur so that a restore point may be created if necessary. Application 230 thus begins to create a potential restore point. The total running score is also reset to zero when a snapshot is turned on. Application 230 may store differential changes to the computer system in a wide variety of matters. Changes may be stored in a log format, in a table, in a database, etc. Data may be recorded using plain text, a binary representation, symbolic information, etc. In the embodiment where application 230 is XP System Restore the change information is stored in a restore point log using known techniques. An example restore point log is shown in FIG. 8.

If the event is a process termination (step 422) and a snapshot is not currently on (step 426) then control returns to step 406. In this situation, because a snapshot was not turned on at the start of the process no changes have been recorded and presumably any relevant activity has already happened. This situation would happen infrequently. This situation might occur if the process starts (process parameters are initialized), is blocked by a process monitor, and then the process is terminated (cleanup of the resource occurs). In this situation the process is not actually successfully running.

On the other hand, if a snapshot has been turned on, then in step 430 the current running score is compared to the threshold number (for example, 10). If the score is not greater than the threshold then the current snapshot is canceled (by sending an appropriate command via the API to application 230) and control returns to step 406. In other words, if the process has ended while a snapshot is on but the nature of the monitored events is such that their total score is not greater than the threshold, then this score implies that the events happening during the process are likely not to constitute malware, or that the process itself is not malware. In this situation the snapshot is canceled and no restore point is created. Application 230 would then stop recording any differential changes to the system. In the embodiment where application 230 is XP System Restore specific commands are given to cancel a snapshot as shown below:

Set pRestorePtSpec.dwEventType=END_SYSTEM_CHANGE

Set pRestorePtSpec.dwRestorePtType=CANCELLED_OPERATION

SRSetRestorePoint(PRESTOREPOINTINFO, pRestorePtSpec, PSTATEMGRSTATUS pSmgrStatus)

But, if the running score is greater than the threshold (step 430), then in step 438 a snapshot commit is executed. A running score greater than the threshold indicates that during the current snapshot there has been enough suspicious activity that the current snapshot should be stored as a restore point by application 230. Accordingly, in step 438 a commit command is sent to application 230 which creates a restore point. This command also includes a restore point name to later identify this particular restore point. Application 230 automatically appends the current date and time to the name provided and confirms that a restore point has been created. In the embodiment where application 230 is XP System Restore specific commands are given to commit a snapshot as shown below:

Set pRestorePtSpec.dwEventType=END_SYSTEM_CHANGE

SRSetRestorePoint(PRESTOREPOINTINFO, pRestorePtSpec, PSTATEMGRSTATUS pSmgrStatus)

The commit command indicates to application 230 that the differential changes currently being recorded in the existing snapshot are important enough that the snapshot should be recorded as a restore point. Application 230 will continue to record differential changes until either a commit snapshot or cancel snapshot command is received. If a restore point is created for the current snapshot (by issuing a snapshot commit command at the process end) then any future restore performed by the computer system will restore the computer to a state existing at the beginning of the process. Thus, any potential adverse effects caused by the malware during execution of process will be reversed. The snapshot commit command also functions to cancel the current snapshot in progress such that a new snapshot may be turned on immediately thereafter if necessary. Once a restore point is created, it can be analyzed later (as well as other restore points) using the restore adviser module to determine if this restore point is indeed the beginning of a malware infection.

FIG. 8 illustrates an example of a restore point log 500. The restore point log includes the information saved from the current snapshot and represents a particular restore point at a particular point in time; using information from a restore point log a user can restore a computer system to that point in time represented by the restore point. In one embodiment, the restore point log includes a snapshot of all relevant system information at a particular point in time.

Restore point log 500 is an example of a simple log that may be created after a computer system has undergone very minor changes. Of course, a restore point log may become much more complicated, may contain many more entries, and may include different types of information. The log details section 504 includes administrative details pertaining to the restore point including a restore point name, a restore type (automatic—intelligent or user—manual), a log time indicating the beginning of the snapshot and the end of the snapshot, a total score and a snapshot point. The snapshot point is linked to the identifier created by snapshot/restore application (230), for example, 0x00000001, 0x00000002, etc.

New file section 508 includes a listing of any new files that have been created or "dropped" during this snapshot. This section shows that there are two new files. Modified file section 512 includes a listing of any files that have been modified during this snapshot. Shown is a single file that has been modified. New Registry section 516 includes a listing of any new entries into the Registry. Shown is a single new listing having a key, a value and data. Modified Registry section 520 includes a listing of any modifications to the Registry. In this example there have been no modifications. Process creation section 524 includes a listing of all processes created during the snapshot. Shown is a single new process that has been created. Process termination section 528 includes a listing of any processes that have been terminated during this snapshot. Shown is a single process. Other types of information may also be included in the restore point log such as e-mail activity, the patch system service table, APIs, and process names such as "Process Name=malware.exe API: ZwCreateKey."

In step 442 it is determined if the event is a file access event or a registry access event. If not, then control returns to step 406. If yes, then in step 444 it is determined if a snapshot is currently on. If yes, then in step 446 the score for that event is added to the running total and then control returns to step 406. If a snapshot is not currently on, then control moves from step 444 to step 406.

The above steps in FIG. 6 illustrate one example of the logic that may be used to analyze monitored system events in real time to determine if enough suspicious activity has occurred such that a restore point should be created corresponding to the beginning of that suspicious activity. Of course, other types of system events may be considered, events may be scored differently, the threshold may be adjusted, snapshots may be turned on or off at different times and the snapshot commit command may be issued at different times. Advantageously, the above logic presented and its variations operate to create any number of restore points that correspond to the beginning of suspicious system activity that is likely to coincide with a malware infection.

Figure 9:
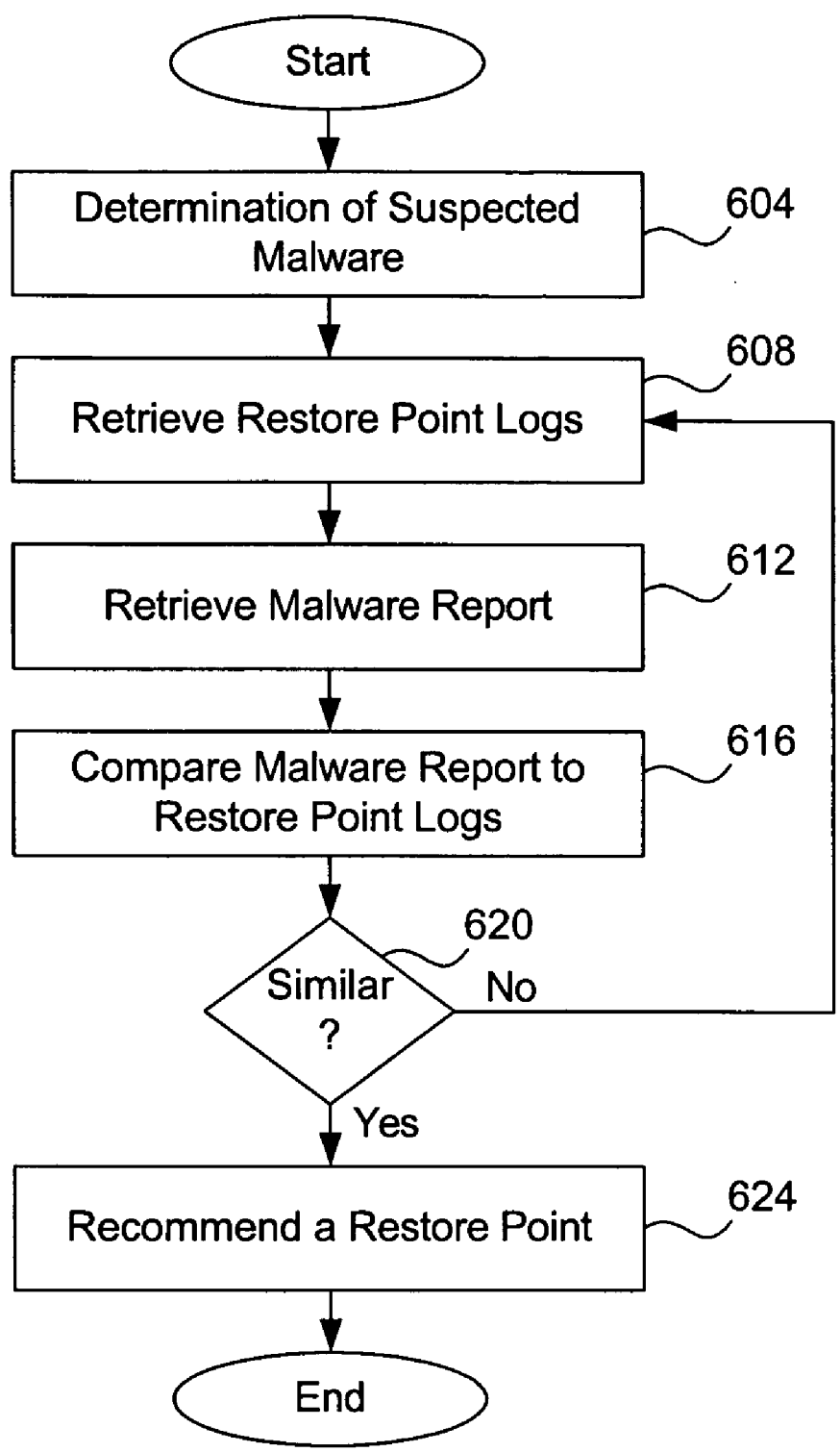
FIG. 9 is a flow diagram describing operation of the restore adviser module.

FIG. 9 is a flow diagram describing operation of the restore adviser module 250. The restore adviser receives a malware report listing characteristics of a particular piece of malware and compares it with the user's saved restore point logs. With this analysis, the restore adviser can make an informed decision and provide a recommendation to the user regarding which restore point is the best from which to restore their computer system to achieve a malware-free state. By advising the user on which restore point to use, the present invention saves the user invaluable time and can provide assurances that the computer will be restored to a state free from malware. The malware report is prepared by TrendLabs of Trend Micro, Inc. or by any other party that has the capability to analyze actions that malware takes and can prepare a report listing those actions and the characteristics of the malware.

In step 604 a user or administrator of the computer system in question makes a determination or realizes that malware has infected the computer system or is present on the computer system, and desires to take action to remove the malware. The user then takes action to initiate operation of the restore adviser module of the present invention. Because the present invention has previously been in operation on the computer system monitoring system operations and creating restore points, the restore adviser module can now analyze those previously created restore points to determine which one to recommend.

In step 608 the restore adviser module directs that any previously created restore point logs be retrieved from application 230. In various embodiments settings or options are provided to allow the user to retrieve restore point logs from any previous time period such as the past 24 hours, the past week, any time previous to a certain date or time, etc. The user may also specify that "the last 10 restore point logs be retrieved for comparison," for example.

In the embodiment in which application 230 is Microsoft XP System Restore the restore point logs may be stored external to application 230 for easier access. To retrieve the logs from storage in one embodiment an interface is wrapped to query the data. By default, the restore adviser module will retrieve all the restore point logs previously created.

In step 612 a malware report is retrieved (or any number of malware reports are retrieved) from the entity that has prepared it by request from the restore adviser module. The malware report can be received over the Internet, by electronic mail, over a local network, or by any other suitable medium. In a preferred embodiment, malware reports are received from Trend Micro Inc. An example malware report is discussed below. In one specific embodiment, all malware reports available are retrieved from the web site.

In step 616 the retrieved malware report is compared to the restore point logs created earlier by application 230. In one embodiment of invention, the malware report is compared to each restore point log in turn starting with the most recent restore point log and moving backwards in time. Of course, the comparison may also be done in other orders. As shown in FIG. 8, the restore point log keeps a record of certain types of events such as any new files created, any modified files, any new entries in the registry, any modifications to the registry, any processes created and any processes terminated. In a similar fashion, a malware report also keeps track of these same types of actions (and a great deal more) that the malware performs.

An analysis is then performed to determine if any of the entries in the restore point log are similar to the known actions of malware as indicated in the malware report. For example, new files from the restore point log are compared to new files that the malware typically creates. Also, any modified file in the restore point log is compared to the malware report to see if that particular malware also modifies the particular file. Further, new or modified registry entries from the restore point log are compared to the malware report to see if that particular malware also creates or modifies registry entries in the same fashion. In one embodiment, all of the restore point logs are compared to a single malware report first and then the logs are compared to the next malware report, etc. In an alternative embodiment, a single restore point log is compared to all of the malware reports first and then the next log is compared, etc.

A restore point log is compared to a malware report by event category. For example, the event of a dropped file is compared between the restore point log and the malware report. If any transformations are required they are performed before the comparison. For example, we transform "% windows %\explorer.exe" in a malware report to "c:\windows\explorer.exe" to be compatible with the client machine's restore point log.

If it is determined that none of the restore point logs are similar to the retrieved malware report then this is an indication that the particular malware characterized by the malware report has not appeared in the computer system during the time periods represented by the restore point logs. In such a situation, control returns to step 612 where another malware report is retrieved for comparison. In this fashion, the restore adviser module can loop through all of the relevant restore points logged and the applicable malware reports to determine which particular restore point is most likely the beginning of a malware infection.

The restore adviser determines that a restore point log is similar to a particular malware report using any of a wide variety of criteria. For example, if a malware report lists three occurrences of files being dropped in a particular folder, and a restore point log lists a total of ten events that include the same three files being dropped in the same folder as indicated by the malware report, then it can be determined that the malware has infected the computer during the time period indicated by the restore point log. Other criteria may also be used to determine that a restore point log is similar to a malware report. For example, consider a restore point log that includes the following information:
KEY:
HKEY_LOCAL_MACHINE\SOFTWARE\Microsoft\
Windows\CunentVersion\Run
  VALUE: CallSpyware
  DATA: C: \Windows\spyware.exe
  Now consider a malware report that includes:
KEY:
HKEY_LOCAL_MACHINE\SOFTWARE\Microsoft\
Windows\CurrentVersion\Run VALUE: CallAdware
DATA: % Windows %\spyware.exe Although the value is different in the restore point log it points to the same file location, so we treat this entry as being the same item.

Once the analysis has determined that malware has infected the computer system at a particular restore point, the restore adviser module recommends that the user perform a restore from that restore point or from an earlier restore point. In other words, should the events recorded in a restore point log indicate that malware is present, restoring the computer system using that restore point will restore the state of the computer to a point in time just prior to when the malware infection began. The restore adviser module will thus recommend that this restore point be used; the computer will be restored to a malware-free state that is as late in time as possible.

Alternatively, the user may elect an earlier restore point from which to restore, or the user may even choose a later restore point if they do not wish to lose information created after that point in time. In addition, in a situation where the above analysis indicates that malware is present at multiple restore points, the restore adviser module will recommend restoring from the earliest restore point that evidences a malware infection. An analysis resulting in no restore point logs matching any of the malware reports indicate that it is unlikely that malware has infected the computer and no restore is recommended.

Example Malware Report

A malware report may contain any of a variety of information that describes the characteristics of malware, actions that it takes, identifying features, solutions for its removal, statistics regarding its spread, etc. In one embodiment of the invention, a malware report is a text document including sections that provide an overview of the malware, technical details, its solution and statistics. A malware report may also be embodied in other forms and include other information such as the antivirus software detection result log.

An overview section of the malware report lists the name of the malware, its type, whether it is operating in the wild, whether it is destructive, the language it uses, the platform on which it operates and whether it is encrypted or not. A brief description of the malware is given including where it drops files and their names, how it might propagate itself via e-mail, whether it has backdoor capabilities, etc. A much fuller detailed description of the malware is provided in the technical details section of the malware report.

The technical details section of the malware report includes information concerning the technical nature of the malware, its installation, network propagation, its e-mailing routine, any backdoor capabilities, any password guessing techniques, any antivirus retaliation techniques, any file infection routines and other information indicating hidden behavior (such as a root kit) or API hooking.

The technical details section lists which type of files the malware infects, how it propagates, the size of the malware in bytes, when initial samples were received, to which other malware it is related, the number of payloads and the actions each take including their trigger conditions. Also listed is whether the malware is compressed and using which technique, in which language it is written, which operating system events it might register (such as Windows events), whether it requires certain APIs, etc.

Regarding its installation, the technical details section describes whether the malware drops files, and if so, the name of each file dropped and into which system folder they are dropped, and whether the dropped files are copies of the malware. This section also lists any entries the malware adds to the registry, any registry keys that the malware modifies, any registry keys that are added to help the malware install itself as a service, and any entries into WIN.INI that are added.

Regarding network propagation, the technical details section lists any folders into which the malware drops a copy of itself once it is active in memory, including any name it might use. It also describes whether the malware creates random file names for these copies and lists any possible extensions that these file names might use. Regarding its mailing routine, the malware report describes how the malware propagates itself via e-mail, if relevant. If applicable, this section describes any e-mail header characteristics such as what will be listed in the "from" line, what might be listed in the "subject" line, what a message body might be, and any lists of the attachments that the malware might attach. The report describes how the malware gathers target e-mail addresses (using registry keys, for example), and how it sends off e-mail messages.

Any backdoor capabilities of the malware is also described including which dropped files it uses, which ports it opens, and whether or not it sends off an e-mail message to a remote location. A full description of these capabilities is also provided. Any password guessing attack is also provided if applicable, including a brute force guessing attack in which the malware report lists how the attack progresses and the passwords that are used. This section also describes what actions the malware takes if the attack is successful such as how the malware searches for possible user names and passwords and where this information is saved.

If the malware uses an antivirus retaliation technique the malware report lists the types of processes or the names of processes that the malware will target in order to terminate them. For example, the malware report will list processes that will be terminated because of the particular string in their name. If applicable, the malware report will also describe the file infection routines used by the malware including which files are targeted and the structure of an infected file.

A malware report may also include a solution section describing how to remove the malware from the computer and a statistics section describing the distribution of the malware overtime.

FIGS. 10A-10G illustrate an example malware report 700 for the worm "PE_LOVGATE.L." Report 700 is an example of a report in that it is an abbreviated version of a full malware report available from the Trend Micro web site. In addition, those of skill in the art will appreciate that similar type reports may be prepared for many other types of worms and for other malware such as viruses, spyware, etc.

Section 705 of the malware report provides an overview of the worm including details such as its size 706, related malware 707, its payloads and trigger conditions 708, and other details such as its language and platform 709. Section 710 lists the files that are dropped into the Windows system folder upon execution. The dropped executable files are copies of the malware while the dynamic link library files are its backdoor components. Section 715 lists the registry entries added by the malware; these entries insure automatic execution of the malware at every computer start up. The last two entries in the list are added registry keys and values that allow the malware to install itself as a service. Section 720 lists any modified registry keys. Section 725 lists any entries added to the file "WIN.INI."

Section 730 lists names of files that are dropped by the malware that contain a copy of itself. These copies are dropped into any shared folder on the network that has read/write access; thus, the malware can propagate itself over a network. The malware also shares the folder "%Windows%Temp" as "GAME" with full access. The malware will also drop into this folder several copies of the virus having random file names with any of extensions found listed in section 735.

The malware also propagates itself via e-mail by replying to all my new messages received. Section 740 shows the format of such an e-mail message. The attachment is randomly selected from any of the files listed in the attachment portion. Further, the malware also propagates itself by gathering target e-mail addresses and sending an e-mail to all those addresses with itself as an attachment. Section 745 lists the target addresses that the malware will use. The malware looks for ".ht*" files in the Windows folder and in the current folder and retrieves the target e-mail addresses from every file that it finds. Section 750 lists any of the many subjects that might be used. Section 755 lists any of the various message bodies that might be used, and section 760 lists any of the many attachments that might be used.

Section 765 lists characteristics of the malware related to its backdoor capabilities. Section 766 lists the ports opened by the malware for backdoor purposes. Section 767 lists any remote threads used by the malware to install itself in memory. Section 768 lists any other ports open for local communication. Section 769 lists any files to which gathered information such as IP addresses, user names and passwords, are recorded. Section 770 lists characteristics of the malware related to its brute-force password guessing attack. Section 771 lists the number of simultaneous threads that the malware will creates to connect to a remote machine for the guessing attack. Section 772 lists all the passwords used by the malware for the brute force attack (the passwords have been omitted because of their sheer number). Section 773 lists any files are dropped; section 774 lists the names of any services executed; and section 777 lists any files used to save information temporarily. Section 778 lists characteristics of any e-mail messages sent by the malware including the address, a subject line, and the SMTP server used.

The malware may also initiate antivirus retaliation techniques. The malware will terminate any process which has any of the strings listed in section 780 in their names. Section 785 lists characteristics of the file infection routine used by the malware to infect fixed drives as opposed to propagation via network and e-mail. Section 790 lists any events registered by the malware. Section 795 lists any files having APIs required by the malware.

Computer System Embodiment

Figure 11A:
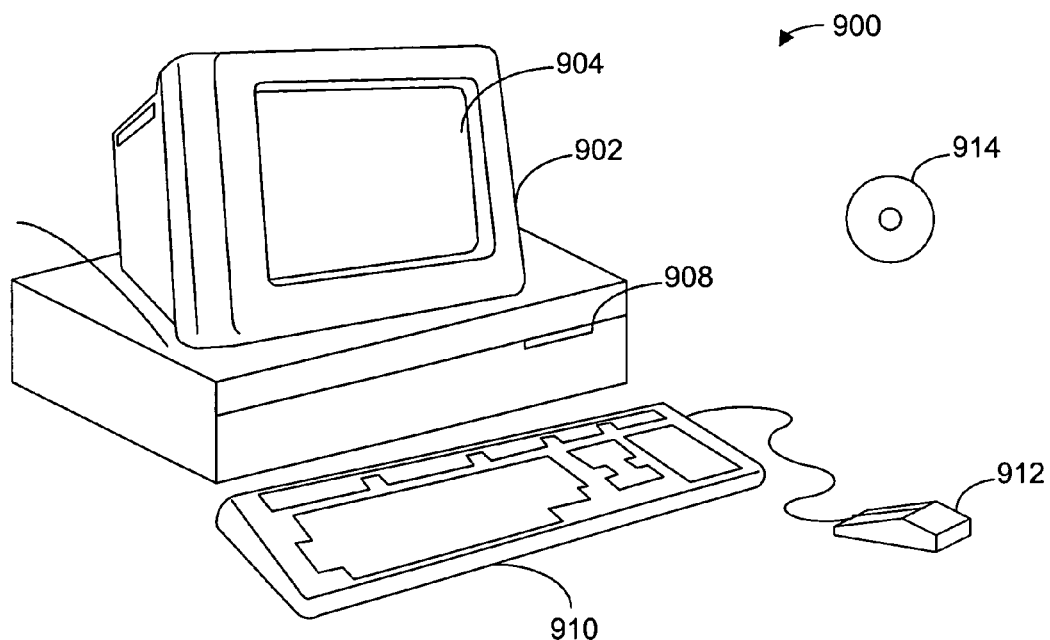
FIGS. 11A and 11B illustrate a computer system 900 suitable for implementing embodiments of the present invention.
Figure 11B:
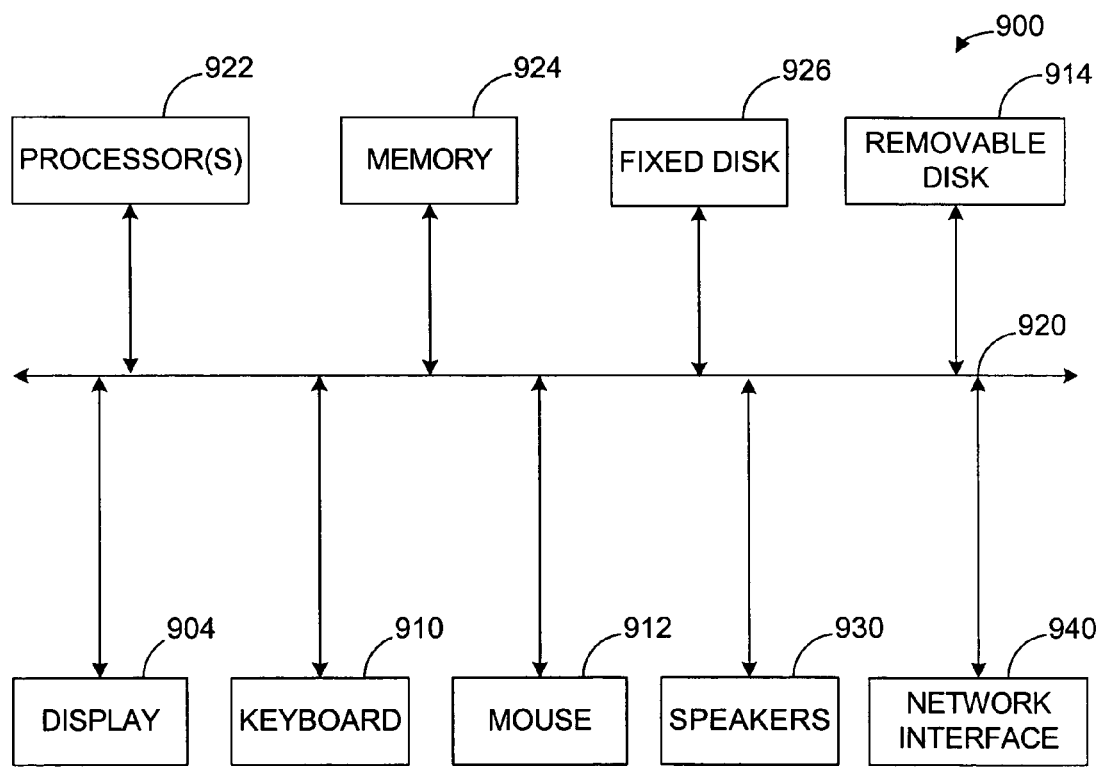

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of creating a restore point for a computer system, said method comprising:

monitoring operating system operations of said computer system using a module of said computer system;

opening a restore point log at the start of a computer process and logging operating system changes in said log after said restore point log is opened;

assigning a score to each of said operations being monitored, said score reflecting the extent to which each of said operations is suspected of being caused by malware;

keeping a running total of said scores for said operations being monitored;

making a determination that said running total is greater than a threshold value; and creating a restore point for said computer system using said operating system changes that have been logged in said restore point log, wherein said restore point represents a point in time before the beginning of possible malware activity in said computer system.

2. A method as recited in claim 1 wherein said creating a restore point makes use of an application programming interface (API) to communicate with a software application.

3. A method as recited in claim 1 wherein said monitoring operating system operations occurs in a module of the kernel of said computer system.

4. A method as recited in claim 1 further comprising:
recommending said restore point from which to restore said computer system.

5. A method as recited in claim 1 wherein said malware is a computer virus, a computer worm or a computer Trojan horse.

6. A method as recited in claim 1 further comprising:
creating said restore point at a point in time before said operating system changes occur.

7. A method as recited in claim 1 wherein said steps of assigning, keeping and making occur while said operating system operations are being monitored.

8. A method as recited in claim 1 further comprising:
making said determination at the end of said computer process.

9. A method of creating a restore point for a computer system, said method comprising:
monitoring operating system operations of said computer system using a kernel mode module of said computer system;

turning on a snapshot utility of said computer system at the start of a computer process and beginning to log operating system changes in a restore point log after said snapshot utility is turned on;

assigning a score to each of said operations being monitored, said score reflecting the extent to which each of said operations is suspected of being caused by malware;

keeping a running total of said scores for said operations being monitored;

making a determination that said running total is greater than a threshold value; and issuing a snapshot commit command and creating a restore point for said computer system using said operating system changes that have been logged in said restore point log, wherein said restore point represents a point in time before the beginning of possible malware activity in said computer system.

10. A method as recited in claim 9 wherein said creating a restore point makes use of an application programming interface (API) to communicate with a software application.

11. A method as recited in claim 9 further comprising:
recommending said restore point from which to restore said computer system.

12. A method as recited in claim 9 wherein said malware is a computer virus, a computer worm or a computer Trojan horse.

13. A method as recited in claim 9 further comprising:
creating said restore point at a point in time before said operating system changes occur.

14. A method as recited in claim 9 wherein said steps of assigning, keeping and making occur while said operating system operations are being monitored.

15. A method as recited in claim 9 further comprising:
making said determination at the end of said computer process.

16. A method of recommending a restore point for a computer system, said method comprising:
retrieving a plurality of restore point logs previously created for said computer system using a module of said computer system;

retrieving a malware report that describes characteristics of a particular piece of malware;

comparing said malware report to said restore point logs;

determining that said malware report is similar to one of said restore point logs; and making a recommendation that said computer system be restored from a point in time represented by said one of said restore point logs, said point in time being prior to a malware infection.

17. A method as recited in claim 16 wherein said comparing compares said malware report to one of said restore point logs category-by-category.

18. A method as recited in claim 16 wherein said malware is a computer virus, a computer worm or a computer Trojan horse.

19. A method as recited in claim 16 wherein each of said restore point logs includes information indicating malware activities within said computer system.

20. A method of recommending a restore point for a computer system, said method comprising:
determining that said computer system should be restored to a previous point in time using a module of said computer system;

retrieving a plurality of restore point logs previously created for said computer system, said restore point logs including changes to said computer system;

retrieving a malware report that describes changes made by said malware to computer systems in which it is present;

comparing said changes in said malware report to said changes in said restore point logs;

determining that said malware report is similar to one of said restore point logs; and making a recommendation that said computer system be restored from a point in time represented by said one of said restore point logs, said point in time being prior to a malware infection.

21. A method as recited in claim 20 wherein said comparing compares said malware report to one of said restore point logs category-by-category.

22. A method as recited in claim 20 wherein said malware is a computer virus, a computer worm or a computer Trojan horse.

23. A method of recovering from malware present in a computer system, said method comprising:
monitoring operating system operations of said computer system using a module of said computer system;

logging operating system changes in a log from a particular point in time;

ranking each of said operating system operations from said particular point in time, said rankings reflecting the extent to which each of said operations is suspected of being caused by malware;

making a determination that a value of said rankings has crossed a threshold value and creating a restore point for said computer system that includes said logged operating system changes;

comparing a malware report to said log, said malware report describing characteristics of a particular piece of malware;

determining that said malware report is similar to said log; and restoring said computer system using said restore point.

24. A method as recited in claim 23 wherein said creating a restore point makes use of an application programming interface (API) to communicate with a software application.

25. A method as recited in claim 23 wherein said monitoring operating system operations occurs in a module of the kernel of said computer system.

26. A method as recited in claim 23 further comprising:

recommending said restore point from which to restore said computer system.

27. A method as recited in claim 23 wherein said malware is a computer virus, a computer worm or a computer Trojan horse.

28. A method as recited in claim 23 wherein said comparing compares said malware report to said restore point log category-by-category.

29. A method of recovering from malware present in a computer system, said method comprising:

monitoring operating system operations of said computer system using a module of said computer system;

turning on a snapshot utility of said computer system and beginning to log operating system changes at a particular point in time in a log;

ranking each of said operating system operations from said particular point in time, said rankings reflecting the extent to which each of said operations is suspected of being caused by malware;

making a determination that a value of said rankings has crossed a threshold value;

issuing a snapshot commit command and creating a restore point for said computer system using said operating system changes that have been logged in said log;

retrieving a malware report that describes characteristics of said malware;

comparing said malware report with said log; and making a recommendation that said computer system be restored from a point in time represented by said log.

30. A method as recited in claim 29 wherein said creating a restore point makes use of an application programming interface (API) to communicate with a software application.

31. A method as recited in claim 29 wherein said monitoring operating system operations occurs in a module of the kernel of said computer system.

32. A method as recited in claim 29 wherein said malware is a computer virus, a computer worm or a computer Trojan horse.

33. A method as recited in claim 29 wherein said comparing compares said malware report to said restore point log category-by-category.

* * * * *